JOSEPH S. APPLE
JACK C. SMELTZER
INVENTORS

BY Arthur Freilich

ATTORNEY

April 12, 1966 J. S. APPLE ETAL 3,246,300

BUFFER REGISTER

Filed Feb. 15, 1961 2 Sheets-Sheet 2

JOSEPH S. APPLE
JACK C. SMELTZER
INVENTORS

BY Arthur Freilich

ATTORNEY

United States Patent Office 3,246,300
Patented Apr. 12, 1966

3,246,300
BUFFER REGISTER

Joseph S. Apple, Canoga Park, and Jack C. Smeltzer, Woodland Hills, Calif., assignors, by mesne assignments, to Bunker-Ramo Corporation, Stamford, Conn., a corporation of Delaware Filed Feb. 15, 1961, Ser. No. 89,477
3 Claims. (Cl. 340—172.5)

This invention relates generally to digital computer equipment and more particularly to a novel and improved buffer register for coupling output information from a high-speed computer to a relatively slow acting device such as a relay.

The speed at which modern digital computer systems can perform is not generally limited by the computer's capability to process information which it has available to it, but rather by the relatively slow rate at which input/output equipment, with which the computer must communicate, operates. In order to make most effective use of the high-speed capabilities of a computer, buffer equipment is often employed between the computer and any slow acting device to compensate for the inequities in speed. A buffer register is capable of receiving information from a computer at a high rate of speed, storing it, and then conveying it at a lower rate of speed to a slow acting device. The use of a buffer register enables the computer to continue on to some other task immediately after it provides the buffer register with the appropriate information.

A buffer register conventionally comprises a group of flip-flops which are capable of being rapidly set by the computer and holding their stored content indefinitely. The prior art indicates that flip-flop buffer registers function satisfactorily to compensate for inequities in speed between a computer and other devices.

Although conventional flip-flop registers satisfy the functional requirements of buffer equipment, they are relatively expensive and accordingly the provision of simpler less expensive storage means is desirable. In view of this, it is the principal object of this invention to provide a buffer register which functions to operatively couple a high-speed digital computer output to slow speed devices, such as relays, and which may be assembled at a considerably lower cost than heretofore known registers.

It is a further object of this invention to provide a buffer register which utilizes fewer components and occupies less space than prior known registers; the novel features of the register principally residing in the use of bistable switching circuits which employ thyristors as switching elements.

It is more particularly an object of this invention to provide means for operatively coupling to a relay, information in the form of pulses shorter in duration than that normally necessary to operate the relay.

It is a still more particular object of this invention to provide a buffer register for operatively coupling information in the form of pulses shorter in duration than that normally necessary to operate a relay, to a relay for affecting the operation thereof in response to said information.

It is a still more particular object of this invention to provide a buffer register comprised of a plurality of bistable thyristor switching circuits having as a feature thereof means which permit input pulses of one polarity to turn the thyristor "on" and which prevent input pulses of an opposite polarity from turning the thyristor "off." As an additional feature, means are incorporated providing thermal stability for the thyristor.

It is a still further object of this invention to provide a buffer register comprised of a plurality of bistable thyristor switching circuits in which the emitters of all of the thyristors are connected together in series with a single transistor control switch.

Broadly, the invention herein relates to novel thyristor switching circuits connected together and under the control of a single control switch to comprise an improved buffer register for coupling high speed computer outputs to slow acting devices, such as relays.

Other objects and advantages, which will subsequently become apparent, reside in the details of circuitry and operation as more fully hereinafter described and claimed, further reference being made to the accompanying drawing forming a part hereof, wherein like identifying numerals refer to like parts throughout the several figures, and in which:

Figure 1:
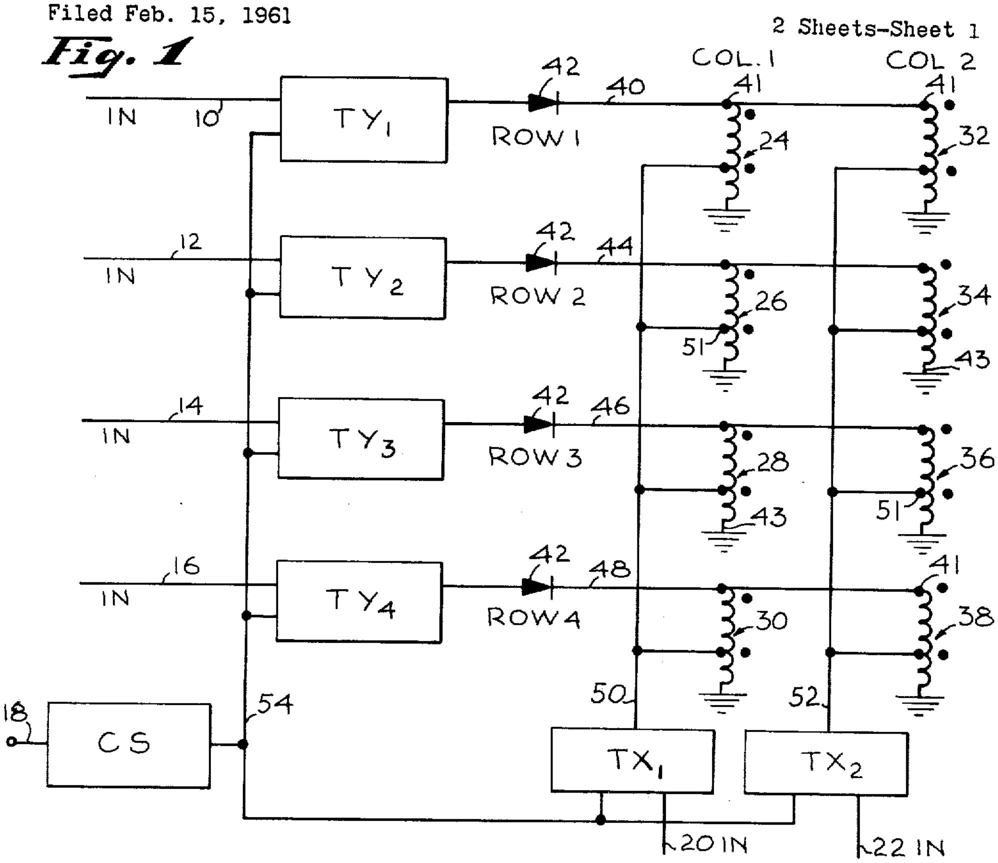
FIGURE 1 is a schematic illustration partially in block form of a plurality of bistable switching circuits and a matrix of bistable load devices showing a general arrangement of how they may be operatively connected.
Figure 5:
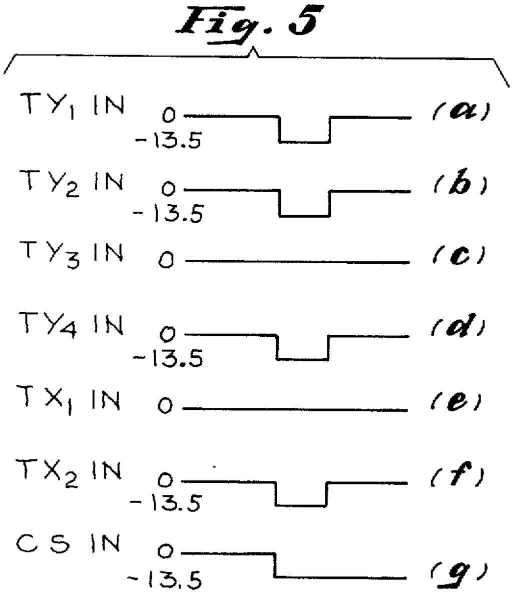
Figure 4:
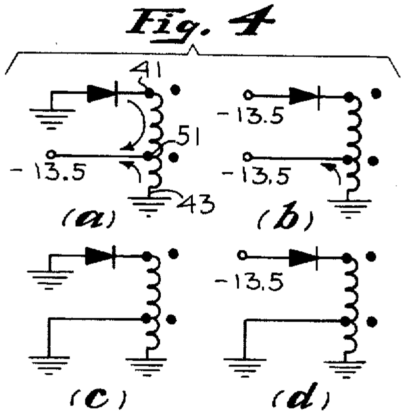

FIGURE 4 includes portions (*a*), (*b*), (*c*), and (*d*) with each portion showing the current flow in the coil of a bistable relay for a different voltage condition set up by circuits connected thereto; and FIGURE 5 is an exemplary showing of a set of voltage wave shapes in time at various points in the arrangement of FIGURE 1.

With continuing reference to the drawing, initial attention is called to FIGURE 1 wherein is shown a plurality of computer output lines 10, 12, 14, 16, 18, 20 and 22. Information from a computer in the form of short duration pulses, of the order of microseconds, is applied to the lines for operating independent equipment such as the bistable relays shown, in response to the information. The relays are arranged in a matrix such that relays 24, 26, 28 and 30 define column 1 of the matrix while relays 32, 34, 36 and 38 define column 2 of the matrix. On the other hand, relays 24 and 32 define row 1, relays 26 and 34 define row 2, relays 28 and 36 define row 3, and relays 30 and 38 define row 4 of the matrix. The relays shown are conventional bistable load devices and are normally responsive to signals at least of a duration of the order of milliseconds. Accordingly, the microsecond pulses on the computer output lines are not capable of directly operating the relays. In order to utilize the computer output information to appropriately operate the relays, some type of buffer equipment must be inserted between the output of the computer and the input to the relays.

A switching circuit $TY_1$ connects line 10 with conductor 40 through diode 42. Conductor 40 is electrically connected to a first end 41 of the coils of relays 24 and 32. In like manner, identical switching circuits $TY_2$, $TY_3$, and $TY_4$ connect lines 12, 14 and 16 through a diode 42 to conductors 44, 46 and 48 respectively. Conductor 44 is electrically connected to a first end 41 of the coils of relays 26 and 34. Conductor 46 is electrically connected to a first end 41 of the coils of relays 34 and 36. Conductor 48 is electrically connected to a first end 41 of the coils of relays 30 and 38.

Switching circuits $TX_1$ and $TX_2$ respectively connect lines 20 and 22 to conductors 50 and 52. Conductor 50 is electrically connected to an electrically unsymmetric tap 51 on the coil of each of the relays in column 1 while conductor 52 is connected to a similar tap on the coil to each of the relays in column 2. A second end 43 of each relay coil is grounded as shown. All of the switching circuits mentioned are identical in circuit detail, as will be better seen below.

A control switch CS connects line 18 to conductor 54 which in turn is connected to each of the identical switching circuits.

Figure 2:
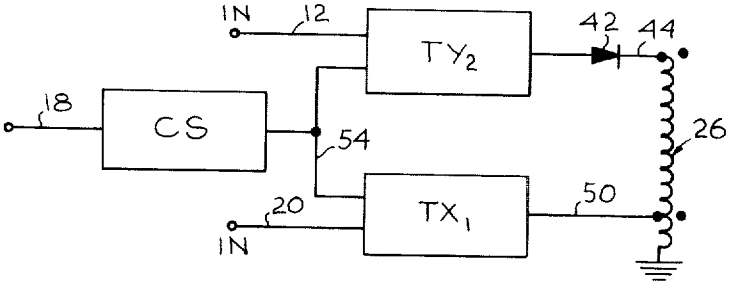
FIGURE 2 is a schematic illustration partially in block form of a portion of the general arrangement illustrated in FIGURE 1 showing in more detail the manner in which a pair of bistable switching circuits, under the control of a single control switch, are operatively coupled to a bistable relay.

Attention is now called to FIGURE 2 wherein a small portion of the general arrangement shown in FIGURE 1 is illustrated. FIGURE 2 is presented to aid in the explanation of the operation of the invention and shows in simplified form how lines 12, 18 and 20 are coupled through $TY_2$, CS, and $TX_1$ respectively to a single relay 26. From FIGURE 1, it will be recalled that a first end 41 of the coil of relay 26 is connected through diode 42 to switching circuit $TY_2$ while the electrically unsymmetric tap 51 on the coil of relay 26 is connected to switching circuit $TX_1$.

Figure 3:
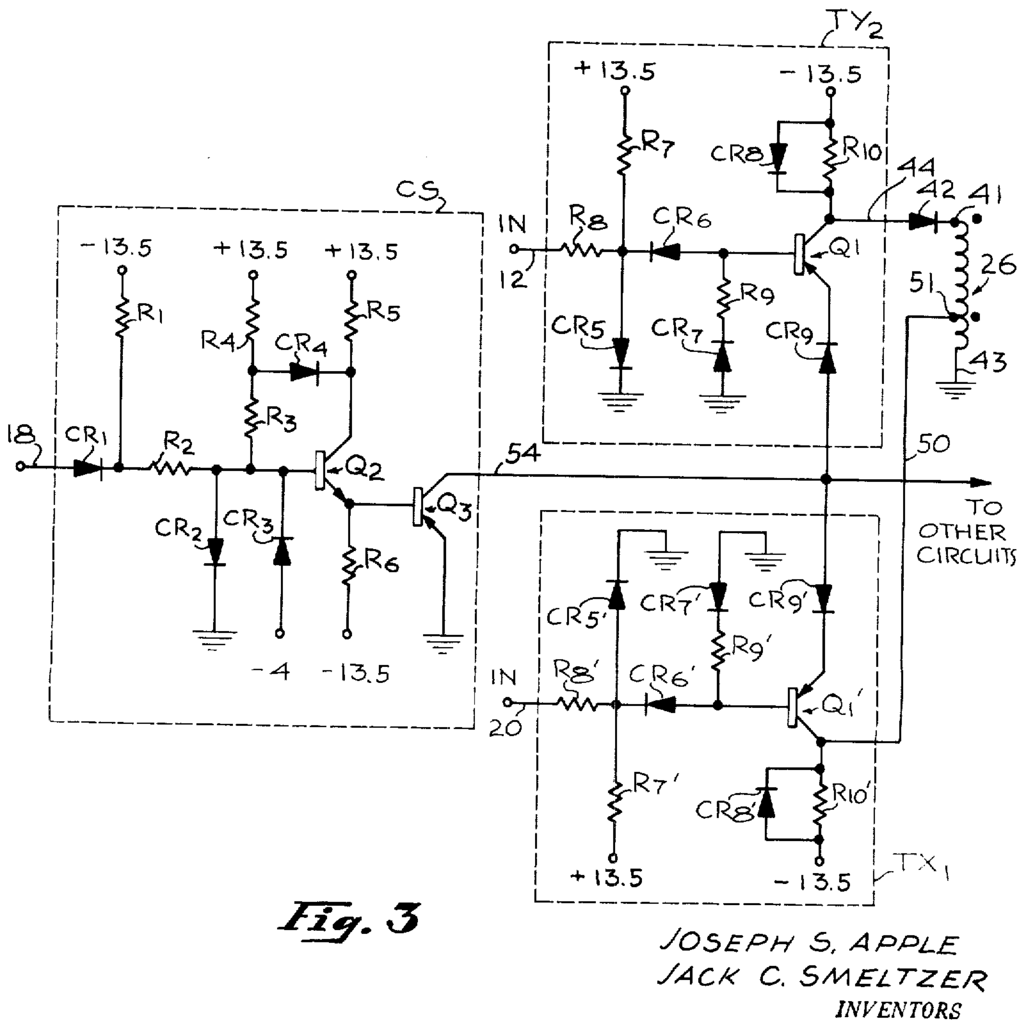
FIGURE 3 is a wiring diagram of the switching circuits and control switch of FIGURE 2.

Passing now to FIGURE 3, attention is called to the circuit details of the control switch CS and the switching circuits $TY_2$ and $TX_1$. Line 18 from the computer is connected to the control switch CS through diode $CR_1$ which is connected in series with resistor $R_2$ to the base of NPN transistor $Q_2$. Resistor $R_1$ connects the junction between diode $CR_1$ and resistor $R_2$ to a $-13.5$ volt potential. Diodes $CR_2$ and $CR_3$ connect the base of transistor $Q_2$ to ground and a $-4$ volt supply respectively. Resistors $R_3$ and $R_4$ are connected in series between a $+13.5$ volt supply and the base of transistor $Q_2$. Diode $CR_4$ connects the junction between resistors $R_3$ and $R_4$ to the collector of transistor $Q_2$ which is in turn connected through resistor $R_5$ to a $+13.5$ volt supply. Resistor $R_6$ connects the emitter of transistor $Q_2$ to $-13.5$ volts. The base of PNP transistor $Q_3$ is connected to the emitter of transistor $Q_2$ and the emitter of transistor $Q_3$ is grounded. As previously noted, conductor 54 connects the control switch CS to each of the identical switching circuits connected to the relay matrix. The conductor 54 is connected in the control switch to the collector of transistor $Q_3$.

Inasmuch as each of the switching circuits connected to the relay matrix is identical, the details of only an exemplary switching circuit, $TY_2$, will be set forth. Components mentioned in switching circuit $TX_1$ corresponding to the components in the switching circuit $TY_2$, to be discussed in detail, will be designated by primed identifying symbols.

Line 12 is connected to switching circuit $TY_2$ through resistor $R_8$ which is connected to the base of thyristor $Q_1$ in series with diode $CR_6$. (Worthy of note here is that the thyristor is a new type of high-speed bistable switching transistor possessing characteristics similar to that of a conventional thyratron tube. Once trigger "on," the thyristor will remain "on" even though the triggering voltage to the base (controlled electrode) is removed.) Resistor $R_7$ connects a $+13.5$ volt source to the junction of resistor $R_8$ and diode $CR_6$ while diode $CR_5$ is connected between the junction and ground. The base of thyristor $Q_1$ is connected through $R_9$ and $CR_7$ to ground. A resistor $R_{10}$ paralleled by diode $CR_8$ connects a $-13.5$ volt supply to the collector of thyristor $Q_1$. Conductor 44 extends from the collector of thyristor $Q_1$ through diode 42, as previously noted, to a first end of the coil of relay 26. Conductor 54 is connected to the emitter of thyristor $Q_1$ through diode $CR_9$.

Switching circuit $TX_1$, as mentioned, is identical to switching circuit $TY_2$. Conductor 50 is connected between the collector of thyristor $Q_1'$ to the electrically unsymmetric tap on the coil of relay 26.

In order to explain the operation of the invention, it is assumed that the computer output presented on lines 10, 12, 14, 16, 18, 20, and 22 to the switching circuits and control switch is always either at ground or $-13.5$ volt, representing false and true conditions, respectively. In order to operate the relays in a particular column of the matrix in accordance with the information in a computer register, it is necessary that the computer be given a command which will cause the contents of the register to be placed on the output lines.

Assume initially that the voltage level on line 18 is at ground potential. The junction of resistors $R_2$ and $R_3$ is at $+.6$ volt due to the clamping action of diode $CR_2$. With the base of NPN transistor $Q_2$ at $+.6$ volt, transistor $Q_2$ is "on" with current flowing from its collector to emitter through resistors $R_5$ and $R_6$. The voltage drop across $R_6$ raises the base potential of transistor $Q_3$ so as to hold it in an "off" state. With transistor $Q_3$ off, it will be apparent that a path to ground is not provided from the emitters of the thyristors of the switching circuits.

On the other hand, when the voltage level on line 18 drops to $-13.5$ volts, transistor $Q_2$ is driven "off" and current then flows from the base of transistor $Q_3$ through $R_6$ to $-13.5$ volts. Transistor $Q_3$ is now "on," and thereby permits the flow of collector-emitter current therethrough so as to provide a ground path from the emitters of the thyristors through conductor 54.

The values of resistors $R_2$, $R_3$, and $R_4$ are chosen so that the junction of resistors $R_2$ and $R_3$ does not go more negative than ground potential until the potential of line 18 goes more negative than $-4$ volts. It is only when line 18 drops to $-13.5$ volts (more negative than $-4$ volts) that the junction of resistors $R_2$ and $R_3$ drops below ground to turn transistor $Q_2$ "off." Diode $CR_3$ prevents the base of transistor $Q_2$ from going more negative than $-4$ volts. Diode $CR_4$ antisaturates transistor $Q_2$.

Resistors $R_7$ and $R_8$ in switching circuit $TY_2$ form a divider network. When the voltage level on line 12 is at ground potential, the junction of resistors $R_7$ and $R_8$ is at $+.6$ volt due to the clamping action of diode $CR_5$. The junction of diode $CR_6$ and resistor $R_9$ is at approximately ground potential and hence diode $CR_6$ is back biased. The values of resistors $R_7$ and $R_8$ are chosen so that the junction between them will not go more negative than ground potential until line 12 goes more negative than $-4$ volts. When line 12 drops to $-13.5$ volts, thyristor $Q_1$ will be turned "on" if transistor $Q_3$ is "on" because the collector of transistor $Q_3$ will be approximately at ground potential. Base current from thyristor $Q_1$ passes through diode $CR_6$ and emitter current is supplied from the collector of transistor $Q_3$. As is characteristic of thyristors, the base current of thyristor $Q_1$ need not be maintained in order to keep it in the conductive state. Therefore, a $-13.5$ volt pulse of only microsecond duration will turn thyristor $Q_1$ "on" if transistor $Q_3$ is "on" and thyristor $Q_1$ will remain "on" even after line 12 returns to ground potential.

Diode $CR_6$ is provided so that when line 12 returns to ground, the positive swing will not be transmitted to the base of thyristor $Q_1$. Negative leakage current which would normally flow from the collector of thyristor $Q_1$ through the base is prevented by diode $CR_6$. In order to prevent this negative leakage current from passing down through the emitter of thyristor $Q_1$, to thereby effectively provide a negative input on the base such as would turn thyrister $Q_1$ "on" a leakage path including resistor $R_9$ and diode $CR_7$ is provided between the base and ground. The inclusion in the circuit of this leakage path provides thermal stability which would otherwise be lost due to the position of diode $CR_6$. Diode $CR_7$ also, however, serves to prevent negative ground noise from triggering thyristor $Q_1$ "on." Diode $CR_8$ prevents the potential of the collector of thyristor $Q_1$ which is connected through diode 42 to one end of a relay coil from exceeding $-13.5$ volts.

It will therefore be appreciated that if the input to a particular thyristor switching circuit is at −13.5 volts when transistor $Q_3$ is "on," the thyristor of that circuit will go "on" and the collector of the thyristor will rise to approximately ground potential. On the other hand, if the input to a particular thyristor switching circuit is not at −13.5 volts when transistor $Q_3$ is "on," the collector of the thyristor of that circuit will remain at −13.5 volts.

It has been seen that the input voltage to a thyristor switching circuit at the time transistor $Q_3$ of the control switch CS is "on" determines the voltage of the thyristor collector which is connected to the coils of bistable relays. In other words, the manner in which a relay is energized depends on the inputs to the switching circuits to which it is connected. Consider the portions (*a*), (*b*), (*c*), and (*d*), of FIGURE 4 wherein a relay coil is shown with respect to the four different possible voltage conditions to which it may be subjected. In FIGURE 4*a*, the voltage at the first end 41 of the coil is at ground (meaning that thyristor $Q_1$ is "on") and the electrically unsymmetric tap 53 is at −13.5 volts (meaning that thyristor $Q_1'$ is "off"). A current flow in the coil (indicated by the arrows) will develop from their end of the coil into the tap. The tap is electrically unsymmetric with respect to the ends of the coil and accordingly more ampere turns will be developed by one current (in the illustration, the upper current) than the other current. As indicated by the polarity dots, the effects of the currents shown are in opposition but because of their unequal effects, the relay will be energized in a first direction. On the other hand, if the voltage condition shown in FIGURE 4*b* is set up (and this would happen if thyristor $Q_1$ is "off"), only the lower current shown would be developed. Accordingly, the relay would be energized in a second direction. With respect to the voltage conditions shown in FIGURES 4*c* and 4*d*, it will be noted that no current flow is developed in the coil. It will therefore be appreciated that in order to energize a relay in either one direction or the other, it is necessary that the electrically unsymmetric tap be at −13.5 volts. This feature permits any particular column in the matrix to be enabled while other columns are disabled; that is, it is only when one of the conductors 50 or 52 is at −13.5 volts that the inputs to the switching circuits $TY_1$, $TY_2$, $TY_3$, and $TY_4$ will be effective to operate the relays in a particular manner. Of course, as pointed out previously unless transistor $Q_3$ of the control switch CS is "on," none of the switching circuits could function.

Attention is now called to FIGURE 5 wherein exemplary wave shapes are set forth. It is assumed that the computer output contains information requiring that relays 24, 26 and 30 be energized in a first direction and relay 28 in a second direction. The computer must apply a −13.5 volt level on line 18 to cause transistor $Q_3$ to go "on." Also, appropriate inputs must be supplied to each of the switching circuits. Line (*e*) of FIGURE 5 shows that the input to switching circuit $TX_1$ is held at ground. Accordingly, the thyristor of switching circuit $TX_1$ will stay "off" when transistor $Q_3$ goes "on" and the thyristor collector and conductor 50 will stay at −13.5 volts. On the other hand, line (*f*) shows that a −13.5 volt pulse is impressed on the input of switching circuit $TX_2$ which causes the thyristor thereof to go "on" when transistor $Q_3$ goes "on" and conductor 54 to go to ground. It will be recalled from FIGURE 4 that a −13.5 volt level on the electrically unsymmetric tap 53 is necessary to enable the relays of a matrix column. It will therefore be appreciated that only the relays of column 1 are enabled. Lines (*a*), (*b*), and (*d*) show that the switching circuits associated with relays 24, 26 and 30 have a −13.5 volt pulse applied to their inputs and accordingly the thyristors thereof will go "on" setting up the condition shown in FIGURE 4*a* with both ends of the coil at ground. Relays 24, 26, and 30 are therefore energized in a first direction. On the other hand, relay 28 has its first end at −13.5 volts because the thyristor of the switching circuit associated therewith did not go "on" (because its input shown in line (*c*) was held at ground) and therefore relay 28 is energized in a second direction in accordance with the showing in FIGURE 4*b*.

From the foregoing, it should be appreciated that applicant has provided improved and simplified means for operatively coupling short duration pulses to bistable load devices normally not capable of operating with such pulses. The improved means comprise a plurality of novel thyristor switching circuits which are connected together under the control of a single control switch. The thyristor switching circuits and the buffer register formed by the arrangement of several of them represents a significant advance over known prior art alternatives due to the considerable reduction in cost and space requirements. It of course will be realized that any quantitative values set forth herein are exemplary only. Further, the invention may be appropriately used with a matrix of any size and it is to be understood that the particular matrix illustrated was offered only to facilitate the explanation of the invention. Moreover, the teachings of the invention are equally applicable to other types of bistable load devices.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The following is claimed as new:

1. In combination with a bistable relay including a coil having first and second ends and an electrically unsymmetric tap, first and second switching circuits each capable of providing first and second voltage level outputs, said second end of said coil connected to a voltage level source equal to said second voltage level output; diode means connecting said first switching circuit to said first end of said coil for preventing current flow through said first end when said first switching circuit provides a first voltage level output; and means connecting said second switching circuit to said tap whereby current will flow in said coil only when said second switching circuit provides a first voltage level output and said coil will be energized in a direction determined by the voltage level output of said first switching circuit.

2. The combination of claim 1 wherein each of said first and second switching circuits includes a thyristor having a base, a collector, and an emitter; an information carrying line connected to the base of each of said thyristors, and means providing information on said lines in the form of pulses shorter in duration than that necessary to operate said relay but of sufficient duration to cause said thyristors to change state.

3. In combination with a matrix of intersecting rows and columns of bistable relays, each relay including a coil having first and second ends and an electrically unsymmetric tap;

- a plurality of first switching circuits;
- a plurality of second switching circuits;
- each of said switching circuits capable of providing first and second voltage level outputs;
- means connecting said second end of all of said coils to a voltage level source equal to said second voltage level output;
- a plurality of diode means each connecting a different one of said first switching circuits to the first ends of all of said coils in a single matrix row; and
- means connecting each of said second switching circuits to all of said taps in a different one of said matrix columns whereby current can flow in each of said coils when the second switching circuit connected thereto provides a first voltage level output in a direction determined by the voltage level output provided by the first switching circuit connected thereto.

References Cited by the Examiner

UNITED STATES PATENTS

| | | | |
|---|---|---|---|
| 2,708,267 | 5/1955 | Weidenhammer | 340—174 |
| 2,931,022 | 3/1960 | Triest | 340—324 |
| 2,982,946 | 5/1961 | Shugart | 340—172.5 |
| 3,114,882 | 12/1963 | Hofstein | 325—491 |
| 3,122,646 | 2/1964 | Deysher et al. | 307—88.5 |

OTHER REFERENCES

Publication: Application and Circuit Design Notes, Solid State Products, Inc., Bulletin D410–02, May 13, 1960.

Richards: Digital Computer Components and Circuits, D. Van Nostrand Co. Inc., N.Y., page 449, 1957.

ROBERT C. BAILEY, *Primary Examiner.*

JOHN F. BURNS, MALCOLM A. MORRISON, *Examiners.*